(12) United States Patent
Hsu

(10) Patent No.: US 8,348,521 B2
(45) Date of Patent: Jan. 8, 2013

(54) OPTICAL FIBER CONNECTOR

(75) Inventor: Min-Chao Hsu, Taipei County (TW)

(73) Assignee: Advanced-Connectek Inc., Taipei (TW)

( * ) Notice: Subject to any disclaimer, the term of this patent is extended or adjusted under 35 U.S.C. 154(b) by 379 days.

(21) Appl. No.: 12/793,462

(22) Filed: Jun. 3, 2010

(65) Prior Publication Data
US 2011/0243506 A1    Oct. 6, 2011

(30) Foreign Application Priority Data

Mar. 31, 2010   (TW) .............................. 99205664 U

(51) Int. Cl.
*G02B 6/36* (2006.01)
(52) U.S. Cl. .......................................... 385/76; 385/78
(58) Field of Classification Search .................... 385/76, 385/78
See application file for complete search history.

(56) References Cited

U.S. PATENT DOCUMENTS

| 6,293,710 B1 | 9/2001 | Lampert et al. |
| 6,848,836 B2 * | 2/2005 | Ueda et al. ...................... 385/78 |
| 7,189,008 B2 * | 3/2007 | Dye ................................ 385/78 |

* cited by examiner

*Primary Examiner* — Omar Rojas
(74) *Attorney, Agent, or Firm* — Morris Manning & Martin LLP; Tim Tingkang Xia, Esq.

(57) ABSTRACT

An optical fiber connector in accordance with the present invention prevents its components from being assembled incorrectly and comprises a distal housing, a core tube, an extension tube, a spring, a proximal housing and an end tube. The distal housing has a slot. The core tube is mounted longitudinally in the distal housing and has a distal tube and a proximal tube. The extension tube is mounted around and connected to the proximal tube. The spring is mounted around the proximal tube of the core tube and the extension tube. The proximal housing is connected to the distal housing and mounted around the core tube, the extension tube and the spring and has an assembly protrusion that is mounted slidably in the slot to prevent the proximal housing from being connected to the distal housing incorrectly.

13 Claims, 6 Drawing Sheets

OPTICAL FIBER CONNECTOR

FIELD OF THE INVENTION

The present invention is an optical fiber connector that ensures components of the optical fiber connector are assembled correctly.

BACKGROUND OF THE INVENTION

Optical fibers are widely used in communication transmission, permit signal propagation over longer distances and at higher bandwidths than other forms of communications and are made up of a core, a reflective coating and a protective coating. Optical fibers are used instead of metal wires because signals travel along them with less loss and the optical fibers do not propagate electromagnetic interference. The core is a glass or plastic filament that propagates light. The reflective coating is a different glass or plastic with a lower index of refraction and reflects light in the core back into the core. The protective coating keeps the core and the reflective coating from being damaged.

To connect optical fibers to electric devices to transmit and receive signals, conventional optical fiber connectors have been developed and manufactured to interface optical fibers with electric devices. The conventional optical fiber connector is a plug and is plugged into an adapter that is a receptacle of an electric device to transmit and receive signals.

With reference to FIG. 6, U.S. Pat. No. 6,293,710 B1 published on Sep. 25, 2001 titled "Optical Connector Having a One-piece Housing" disclosed an optical fiber connector (2) that is a local connector. The optical fiber connector (2) comprises a front housing (21) and a rear housing (22).

The front housing (21) has a front end, a rear end, two sides, a through hole and two anchor holes (211). The through hole is formed through the front housing (21). The sides are formed between the front end and the rear end. The anchor holes (211) are aligned with each other and formed respectively through the sides near the rear end.

The rear housing (22) has a front end, a rear end, two inner sides, a through hole (221) and two anchor protrusions. The inner sides are formed inside the rear housing (22) and between the front end and the rear end. The through hole (221) is formed through the rear housing (22). The anchor protrusions are aligned with each other, formed respectively on the inner sides and mounted respectively in the anchor holes (211) to connect the rear housing (22) to the front housing (21). However, the front housing (21) and the rear housing (22) may be connected incorrectly if one of both is upside-down.

Therefore, components of conventional optical fiber connectors may be assembled incorrectly. When the components of conventional optical fiber connectors are assembled incorrectly, even if they are connected to each other, functions of the conventional optical fiber connector cannot be performed, defective rate will be higher and manufacturing efficiency will be reduced.

SUMMARY OF THE INVENTION

The objective of the present invention is to provide an optical fiber connector that ensures its components are assembled correctly.

An optical fiber connector in accordance with the present invention comprises a distal housing, a core tube, an extension tube, a spring, a proximal housing and an end tube. The distal housing has a slot. The core tube is mounted longitudinally in the distal housing and has a distal tube and a proximal tube. The extension tube is mounted around and is connected to the proximal tube. The spring is mounted around the proximal tube of the core tube and the extension tube. The proximal housing is connected to the distal housing and is mounted around the core tube, the extension tube and the spring and has an assembly protrusion that is mounted slidably in the slot to prevent the proximal housing from being connected to the distal housing incorrectly.

DETAILED DESCRIPTION OF THE PRESENT INVENTION

Figure 1:
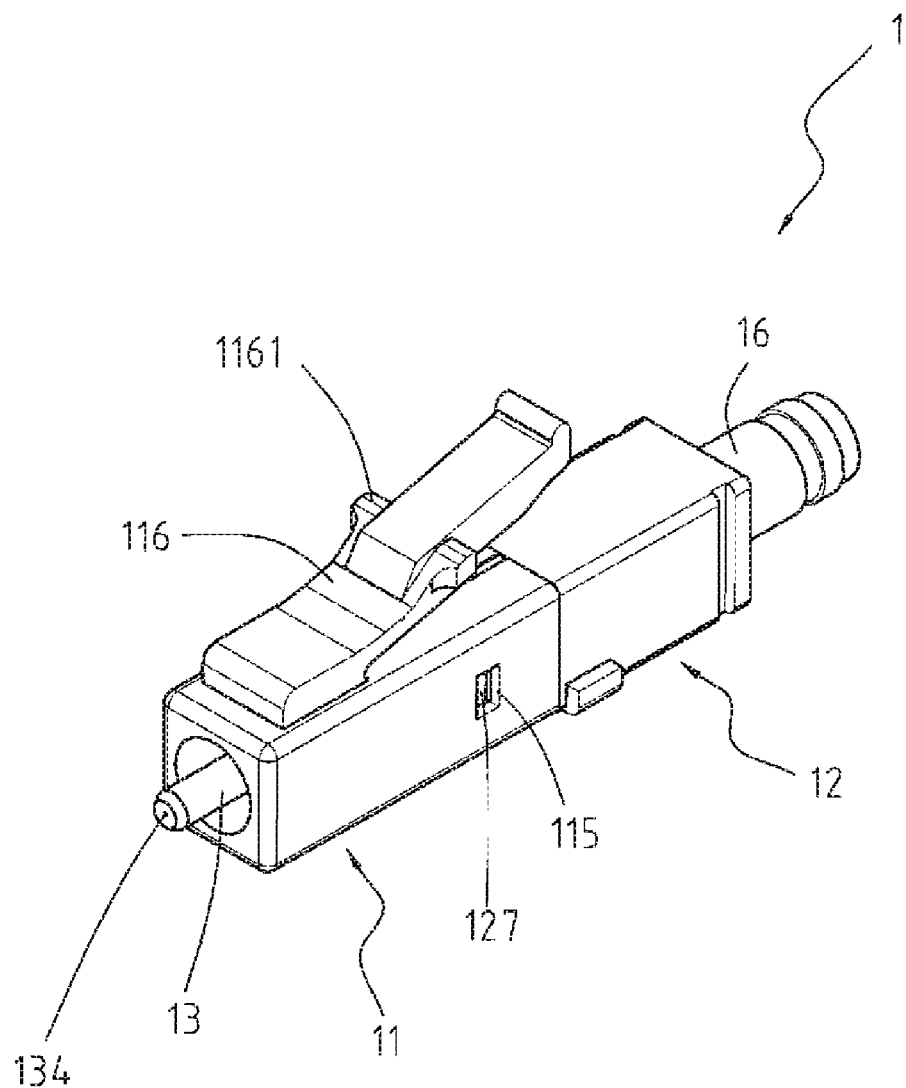
FIG. 1 is a perspective view from a distal end of an optical fiber connector in accordance with the present invention.
Figure 2:
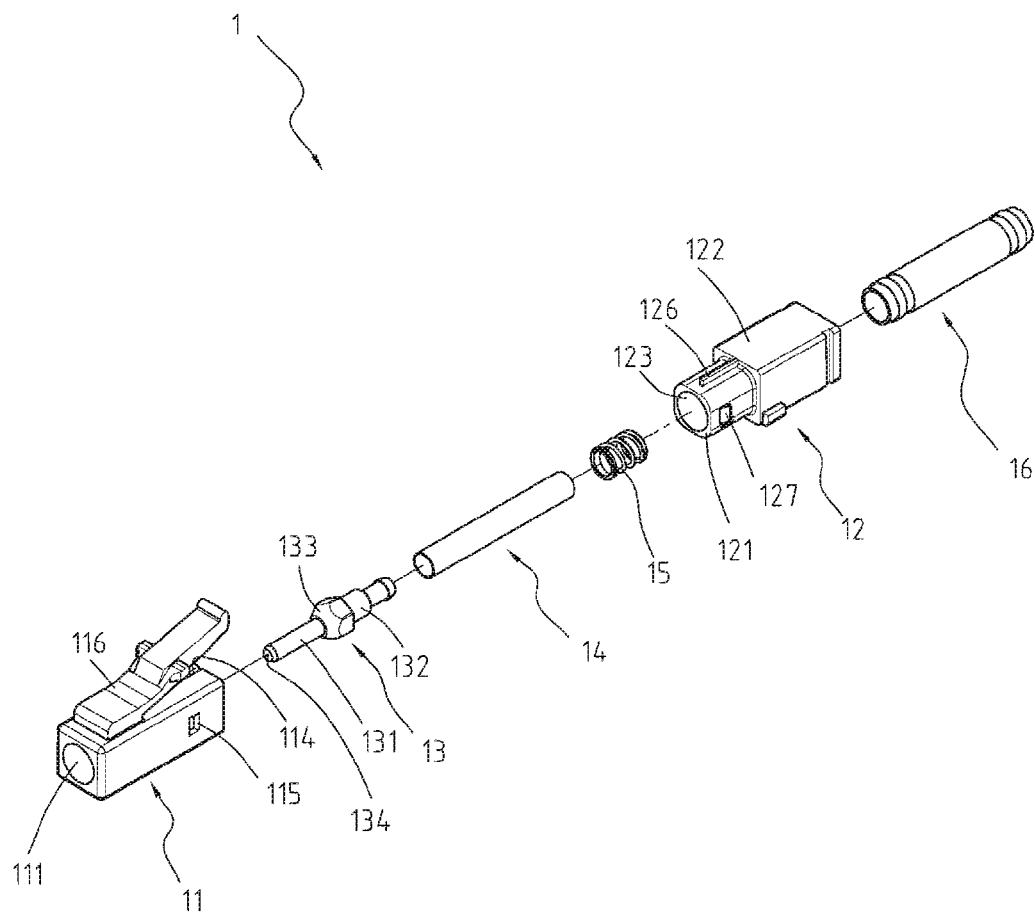
FIG. 2 is an exploded perspective view of the optical fiber connector in FIG. 1.
Figure 3:
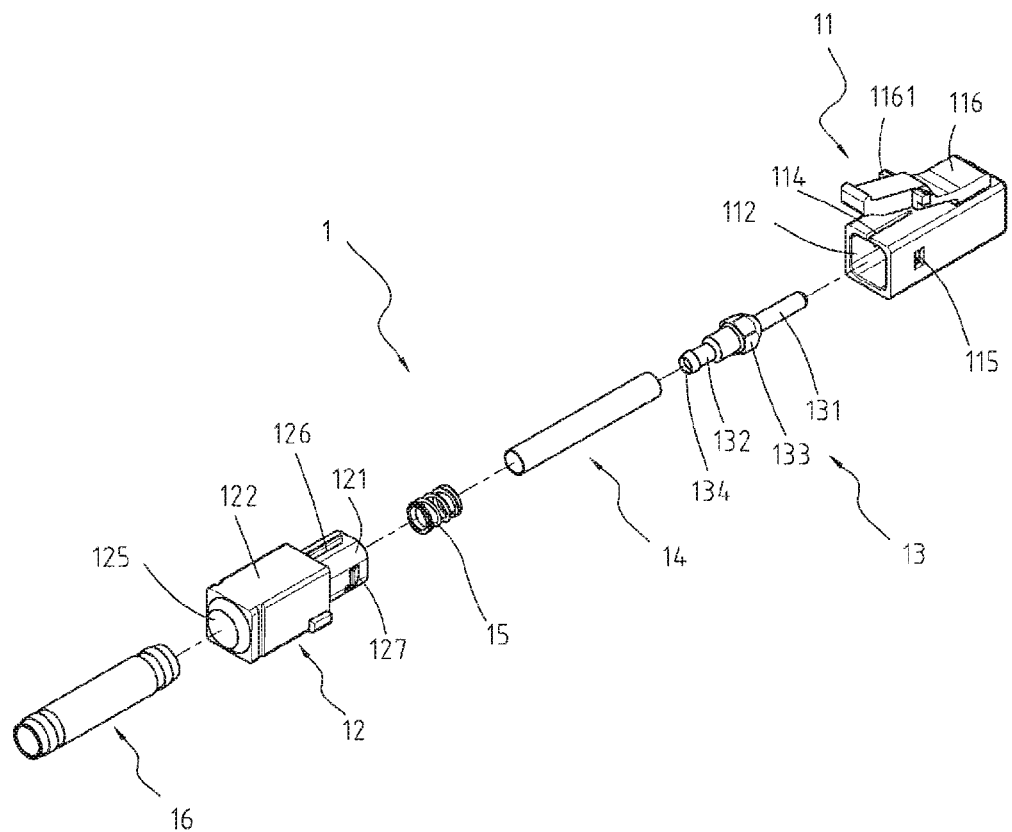
FIG. 3 is an exploded perspective view from a proximal end of the optical fiber connector in FIG. 1.
Figure 4:
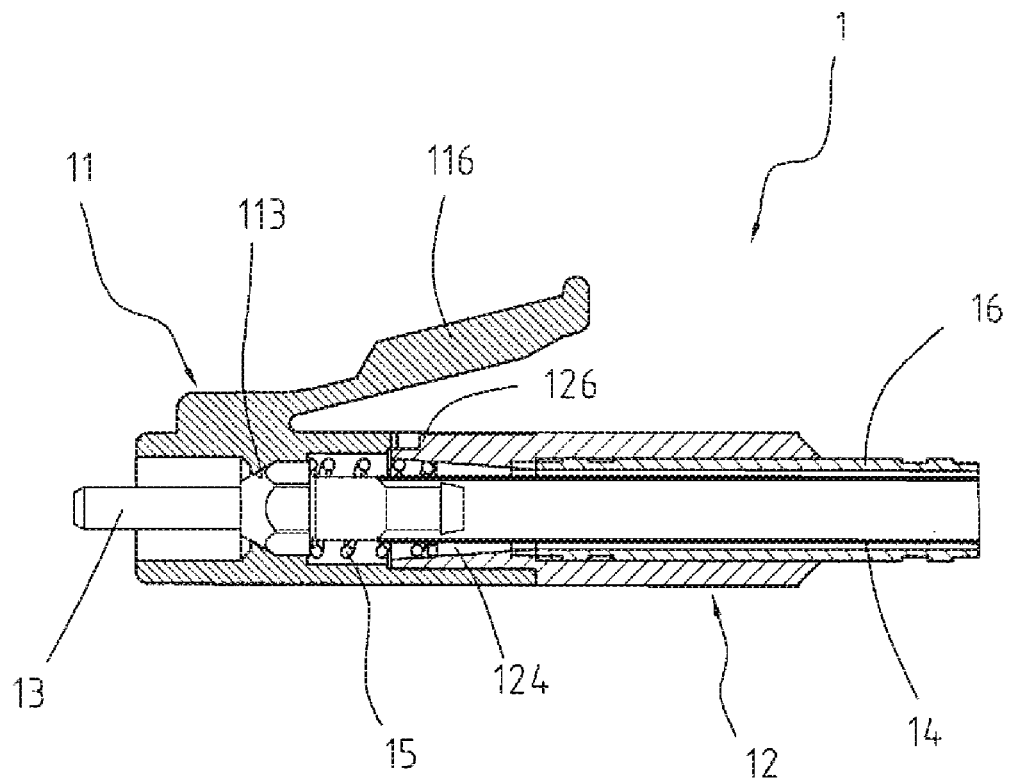
FIG. 4 is a side view in partial section of the optical fiber connector in FIG. 1.
Figure 5:
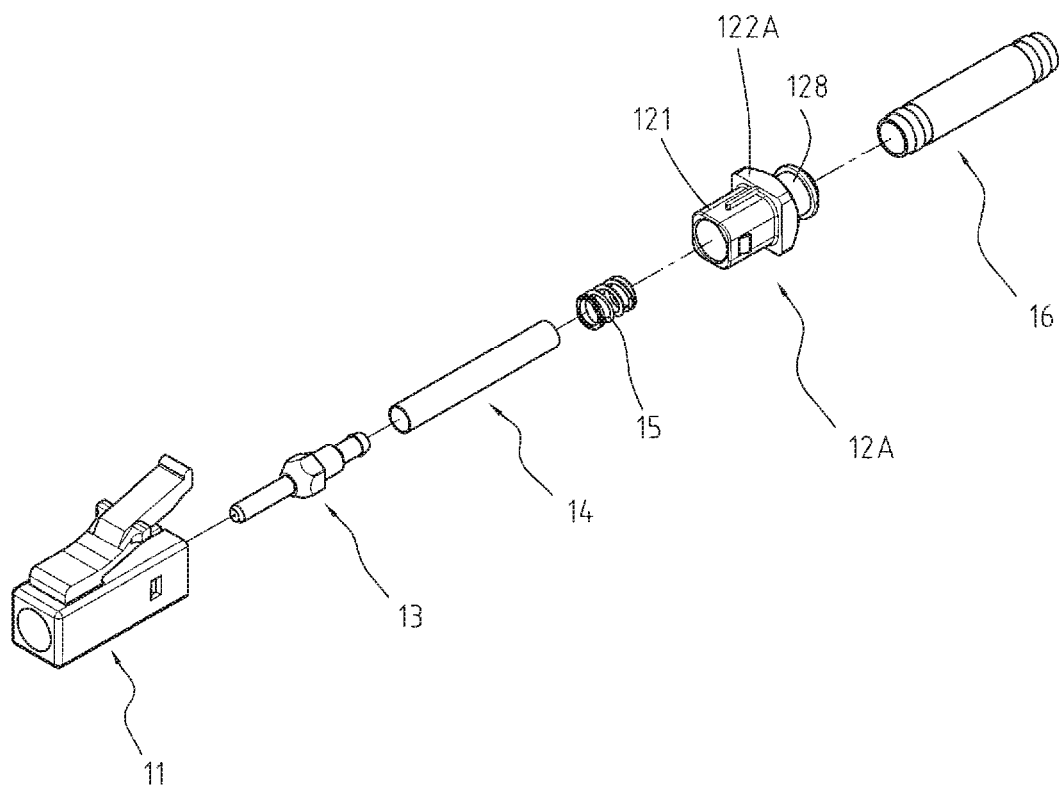
FIG. 5 is an exploded perspective view from a distal end of a second embodiment of an optical fiber connector in accordance with the present invention.
Figure 6:
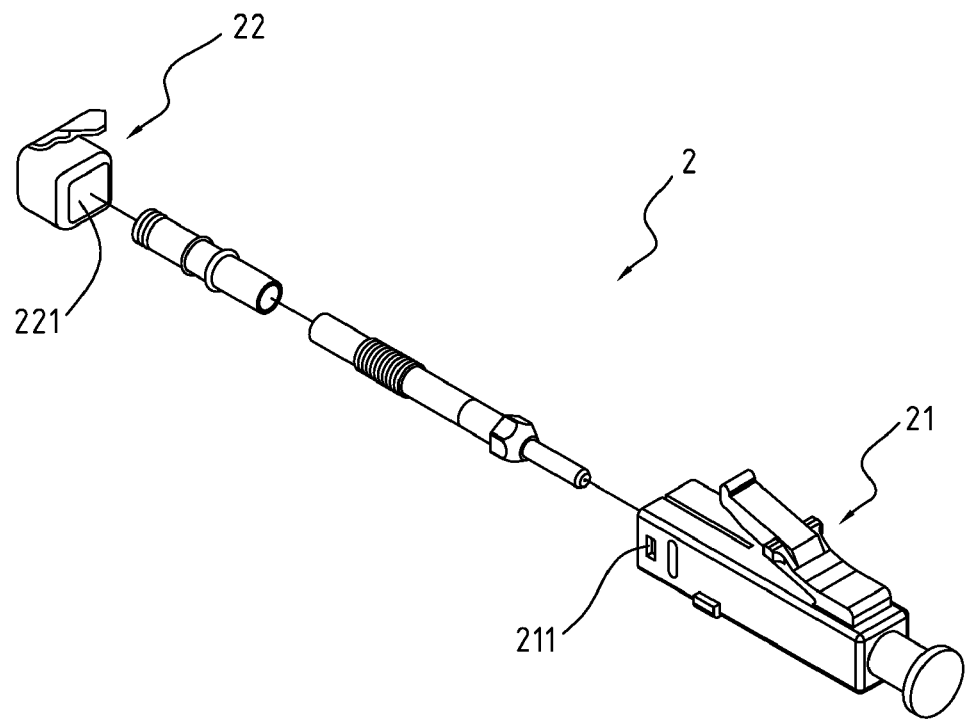
FIG. 6 is an exploded perspective view of a conventional optical fiber connector.

With reference to FIGS. 1, 2, 3, 4 and 5, an optical fiber connector (1) in accordance with the present invention may be a local connector and comprises a distal housing (11), a core tube (13), an extension tube (14), a spring (15), a proximal housing (12, 12A) and an end tube (16).

The distal housing (11) is a parallelepiped and comprises a distal end, a proximal end, an upper wall, a bottom wall, two sidewalls and a latch (116). The distal end has a distal recess (111).

The distal recess (111) is formed longitudinally through the distal end. The proximal end is parallel to and aligned with the distal end and has a proximal recess (112).

The proximal recess (112) is formed longitudinally through the proximal end, communicates with the distal recess (111) and has a distal end, a proximal end and an inner annular lip (113).

The inner annular lip (113) is formed at and protrudes in from the distal end of the proximal recess (112). The upper wall is formed longitudinally between the distal end and the proximal end and has a slot (114) and two longitudinal edges.

The slot (114) is formed longitudinally through the upper wall near and communicates with the proximal end and the proximal recess (112).

The bottom wall is formed longitudinally between the distal end and the proximal end and parallel to and aligned with the upper wall and has two longitudinal edges. The two sidewalls are formed longitudinally between the distal end and the proximal end and transversely between corresponding edges of the upper wall and the bottom wall, and each sidewall has an anchor hole (115).

The anchor holes (115) are aligned with each other and communicate with the proximal recess (112). The latch (116) is formed on and extends upward and backward from the upper wall near the distal end and has two sides and two locking protrusions (1161).

The two locking protrusions (1161) are formed respectively on and protrude out respectively from the two sides to securely connect the optical fiber connector (1) in an optical adapter of an electrical device.

The core tube (13) is mounted longitudinally in the distal housing (11) and comprises a distal tube (131), a proximal tube (132), an annular lip (133) and a through hole (134). The distal tube (131) has a distal end and a proximal end. The distal end of the distal tube (131) juts out of the distal recess (111). The proximal tube (132) has a distal end and a proximal end. The distal end of the proximal tube (132) is connected to the proximal end of the distal tube (131). The annular lip (133) is formed on the proximal end of the distal tube (131) and the distal end of the proximal tube (132) and abuts the inner annular lip (113). The through hole (134) is formed through the distal tube (131) and proximal tube (132).

The extension tube (14) is mounted around the proximal end of the proximal tube (132).

The spring (15) is mounted around the proximal tube (132) of the core tube (13) and the extension tube (14) and abutting the annular lip (133).

The proximal housing (12, 12A) is mounted in the proximal recess (112) around the core tube (13), the extension tube (14) and the spring (15) and comprises an assembly segment (121), a flange (122, 122A) and an optional fixed end tube (128).

The assembly segment (121) corresponds to and is mounted in the proximal recess (112) and has a distal end, a proximal end, an upper wall, a bottom wall and two sidewalls.

The distal end has a distal recess (123). The distal recess (123) is formed longitudinally through the distal end and has an inner annular sidewall and an inner annular lip (124). The inner annular lip (124) is formed on and protrudes from the inner annular sidewall. The proximal end is parallel to and aligned with the distal end. The upper wall is formed longitudinally between the distal end and the proximal end and has an assembly protrusion (126). The assembly protrusion (126) is formed longitudinally on the upper wall and is mounted slidably in the slot (114) to prevent the proximal housing (12) from being connected incorrectly to the distal housing (11). The bottom wall is formed longitudinally between the distal end and the proximal end and parallel to and aligned with the upper wall. The two sidewalls are formed longitudinally between the distal end and the proximal end and transversely between the upper wall and the bottom wall.

Each sidewall has an anchor protrusion (127). The anchor protrusions (127) are formed respectively on the sidewalls of the assembly segment (121) and are aligned respectively with and mounted respectively in the anchor holes (115).

The flange (122, 122A) is formed on and protrudes radially from the proximal end of the assembly segment (121) and is bigger than the assembly segment (121) to abut the proximal end of the distal housing (11), keep the proximal housing (12) from moving forward, may be a parallelepiped and has a distal end and a proximal end. The distal end of the flange (122, 122A) is connected to the proximal end of the assembly segment (121). The proximal end of the flange (122, 122A) has a proximal recess (125). The proximal recess (125) is formed longitudinally through the proximal end of the flange (122, 122A).

The fixed end tube (128) is formed on and protrudes from the proximal end of the flange (122A) and has a through hole. The through hole communicates with the proximal recess (125) of the flange (122A).

The end tube (16) is mounted in the proximal housing (12, 12A) around the extension tube (14) and has a distal end and a proximal end. The distal end of the end tube (16) may be mounted in the proximal recess (125) of the flange (122) or through the fixed end tube (128) of the flange (122A).

What is claimed is:

1. An optical fiber connector comprising:
   a distal housing being a parallelepiped and comprising:
      a distal recess being formed longitudinally through a distal end of the distal housing;
      a proximal recess being formed longitudinally through a proximal end of the distal housing, communicating with the distal recess and having an inner annular lip being formed at and protruding in from the proximal recess;
      a slot being formed longitudinally through an upper wall of the distal housing near and communicating with the proximal recess; and
      two anchor holes being aligned with each other and communicate with the proximal recess;
   a proximal housing being mounted in the proximal recess of the distal housing and comprising:
      an assembly segment corresponding to and being mounted in the proximal recess of the distal housing and having:
         a distal recess being formed longitudinally through a distal end of the assembly segment;
         an assembly protrusion is formed longitudinally on an upper wall of the assembly segment and being mounted slidably in the slot; and
         two anchor protrusions being formed respectively on two sidewalls of the assembly segment and being aligned respectively with and mounted respectively in the anchor holes; and
      a flange being formed on and protruding radially from a proximal end of the assembly segment and having a proximal recess being formed longitudinally through a proximal end of the flange;
   a core tube being mounted longitudinally in the distal housing, jutting out of the distal recess of the distal housing and having:
      a distal tube;
      a proximal tube; and
      an annular lip being formed on a proximal end of the distal tube and a distal end of the proximal tube and abutting the inner annular lip of the proximal recess of the distal housing
   an extension tube being mounted around a proximal end of the proximal tube of the core tube; and
   a spring being mounted around the proximal tube of the core tube and the extension tube and abutting the annular lip of the core tube.

2. The optical fiber connector as claimed in claim 1, wherein the distal housing further comprises a latch being formed on and extending upward and backward from the upper wall of the distal housing near the distal end of the distal housing.

3. The optical fiber connector as claimed in claim 1, wherein the flange is bigger than the assembly segment to abut the proximal end of the distal housing.

4. The optical fiber connector as claimed in claim 1, wherein the flange is a parallelepiped.

5. The optical fiber connector as claimed in claim 1, wherein the proximal housing has a fixed end tube being formed on and protruding from the proximal end of the flange.

6. The optical fiber connector as claimed in claim 1, wherein the optical fiber connector is a local connector.

7. The optical fiber connector as claimed in claim 2, wherein the latch has
   two sides; and
   two locking protrusions being formed respectively on and protruding out respectively from the two sides.

8. The optical fiber connector as claimed in claim 5, wherein the fixed end tube has a through hole communicating with the proximal recess of the flange.

9. The optical fiber connector as claimed in claim 1, further comprising an end tube being mounted in the proximal housing around the extension tube.

10. The optical fiber connector as claimed in claim 9, wherein the end tube is mounted in the proximal recess of the flange.

11. The optical fiber connector as claimed in claim 8, further comprising an end tube being mounted in the proximal housing.

12. The optical fiber connector as claimed in claim 11, wherein the end tube is mounted in the through hole of the fixed end tube and the proximal recess of the flange.

13. An optical fiber connector comprising:
   a distal housing being a parallelepiped and comprising:
   a distal end having a distal recess being formed longitudinally through the distal end;
   a proximal end being parallel to and aligned with the distal end and having a proximal recess being formed longitudinally through the proximal end, communicating with the distal recess and having:
      a distal end;
      a proximal end; and
      an inner annular lip being formed at and protruding in from the distal end of the proximal recess;
   an upper wall being formed longitudinally between the distal end and the proximal end and having:
      a slot being formed longitudinally on the upper wall near the proximal end and communicating with the proximal recess; and
      two longitudinal edges;
   a bottom wall being formed longitudinally between the distal end and the proximal end and parallel to and aligned with the upper wall and having two longitudinal edges;
   two sidewalls being formed longitudinally between the distal end and the proximal end and transversely between the upper wall and the bottom wall, and each sidewall having an anchor hole, the anchor holes being aligned with each other and communicating with the proximal recess; and
   a latch being formed on and extending upward and backward from the upper wall near the distal end and having:
      two sides; and
      two locking protrusions being formed respectively on and protruding out respectively from the two sidewalls;
   a core tube being mounted longitudinally in the distal housing and comprising:
      a distal tube having:
         a distal end jutting out of the distal recess; and
         a proximal end;
      a proximal tube having:
         a distal end being connected to the proximal end of the distal tube; and
         a proximal end;
      an annular lip being formed on the proximal end of the distal tube and the distal end of the proximal tube and abutting the inner annular lip; and
      a through hole being formed through the distal tube and proximal tube;
   an extension tube being mounted around the proximal end of the proximal tube;
   a spring being mounted around the proximal tube of the core tube and the extension tube and abutting the annular lip;
   a proximal housing being mounted in the proximal recess around the core tube, the extension tube and the spring and comprising:
      an assembly segment corresponding to and being mounted in the proximal recess and having:
         a distal end having a distal recess being formed longitudinally through the distal end and having:
            an inner annular sidewall; and
            an inner annular lip being formed on and protruding from the inner annular sidewall;
         a proximal end being parallel to and aligned with the distal end;
         an upper wall being formed longitudinally between the distal end and the proximal end and having an assembly protrusion being formed longitudinally on the upper wall and mounted slidably in the slot;
         a bottom wall being formed longitudinally between the distal end and the proximal end and parallel to and aligned with the upper wall; and
         two sidewalls being formed longitudinally between the distal end and the proximal end and transversely between the upper wall and the bottom wall, and each sidewall having an anchor protrusion being formed respectively on the sidewalls of the assembly segment and being aligned respectively with and mounted respectively in the anchor holes; and
      a flange being formed on and protruding radially from the proximal end of the assembly segment and being bigger than the assembly segment to abut the proximal end of the distal housing and having:
         a distal end being connected to the proximal end of the assembly segment; and
         a proximal end having a proximal recess being formed longitudinally through the proximal end of the flange; and
   an end tube being mounted in the proximal housing and around the extension tube and having a distal end and a proximal end.

* * * * *